Patented May 18, 1926.

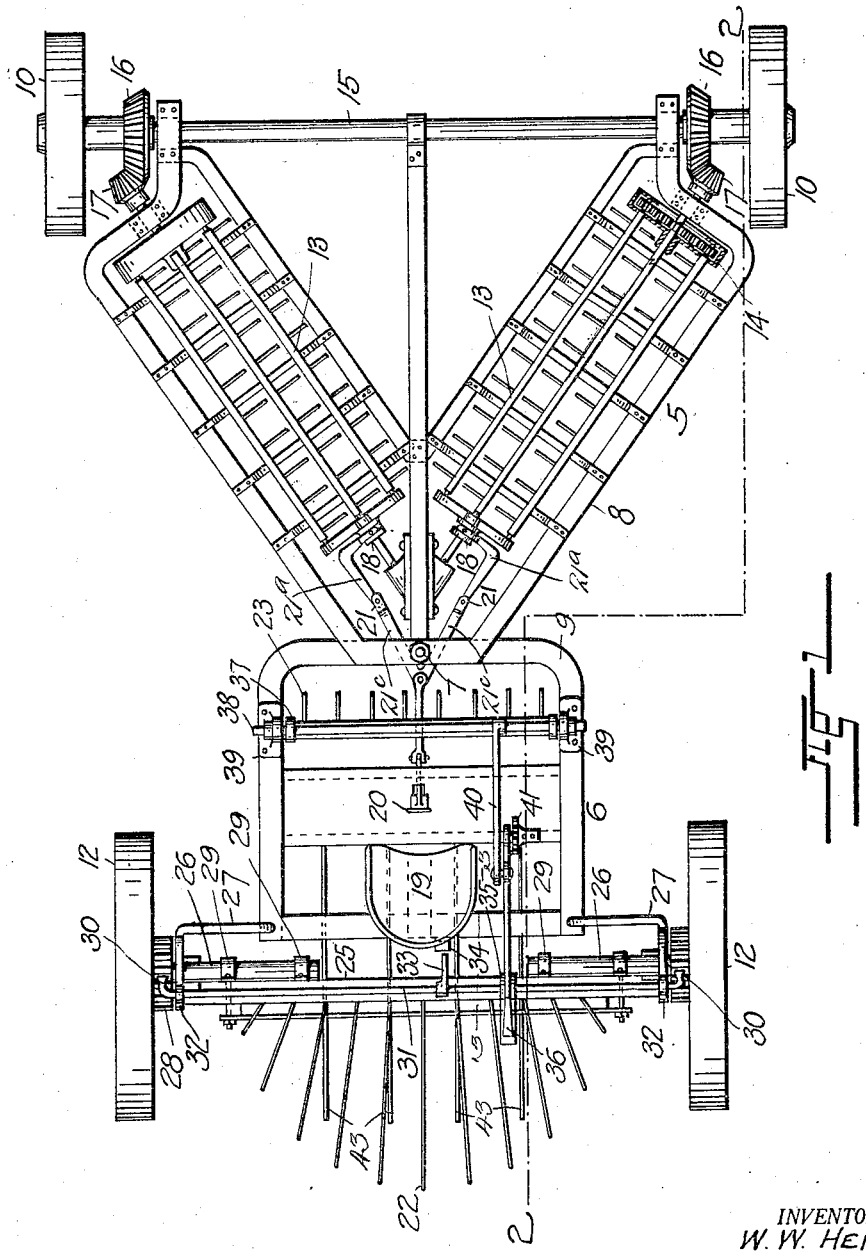

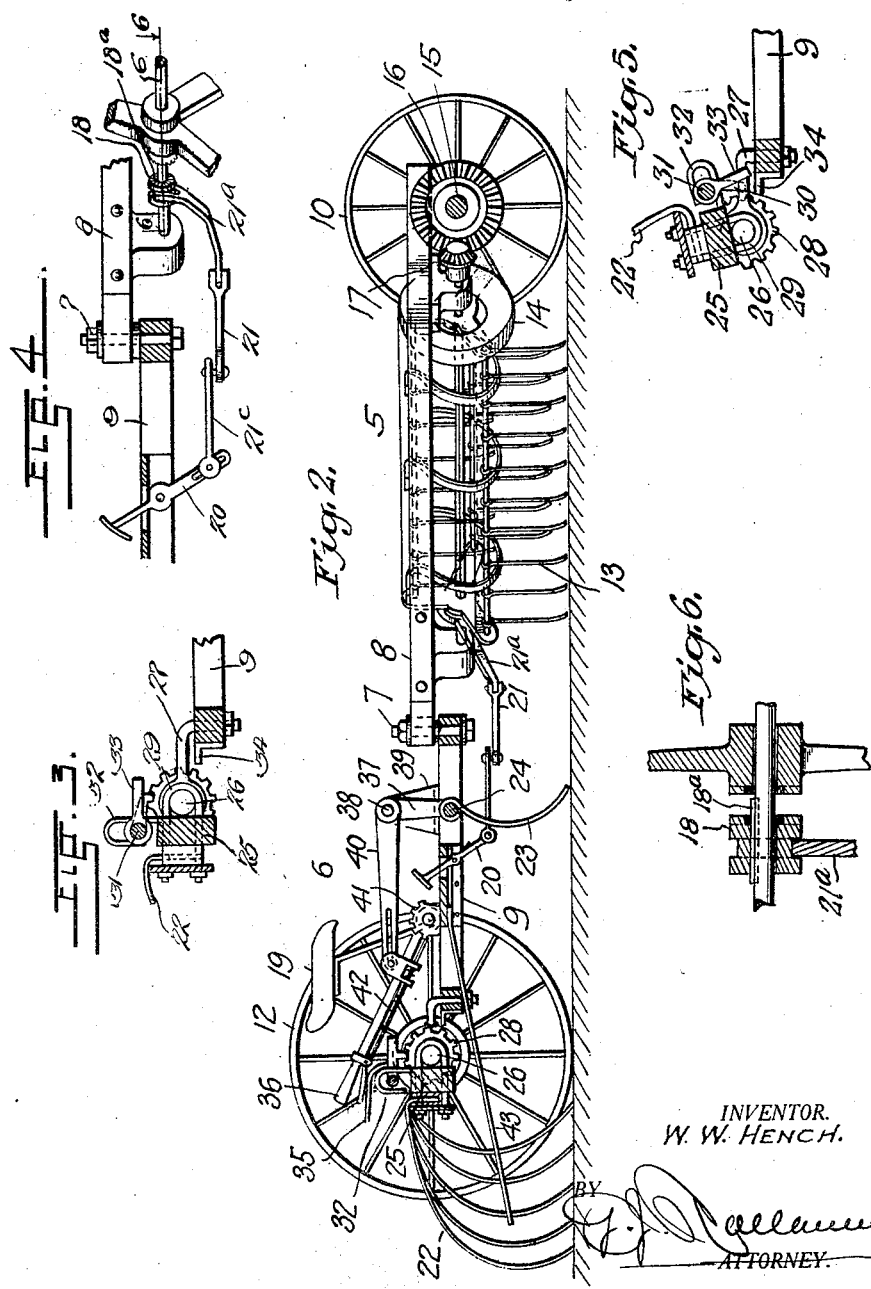

1,585,093

UNITED STATES PATENT OFFICE.

WARREN W. HENCH, OF UNDERCLIFFE, COLORADO.

HAY RAKE AND COCKER.

Application filed January 20, 1920. Serial No. 352,885.

This invention relates to a combined hay rake and cocker and its primary object is to provide a machine of simple and very efficient construction which when drawn across a mown field collects the swath left by the cutting machine into windrows and gathers the hay in the windrows into hay cocks of uniform size and form upon a substantially clean stubble.

I attain this object by the construction and arrangement of devices shown in their preferred form in the accompanying drawings in the various views of which like parts are similarly designated, and in which Figure 1 is a plan view of my improved raking and cocking machine, Figure 2, a longitudinal section taken on the line 2—2, Figure 1.

Figure 3, a section taken on the line 3—3, Figure 1, and Figure 4 an enlarged sectional elevation of the system of clutch shifting levers shown in Figure 2, Figure 5, a sectional elevation similar to Figure 3, showing the pawl disengaged from the toothed wheel of the machine by engagement of the tappet of the element of which the pawl is a part, with the relatively stationary stop, and Fig. 6, a section taken on the line 6—6, Fig. 4.

In carrying out my invention I employ two cooperating elements 5 and 6 which are pivotally connected by a king bolt 7 to facilitate turning.

The element of the machine forward with relation to the direction of its operative movement is designed to rake the swath into a windrow and the second element acting upon the windrow gathers the hay into cocks of uniform size and dumps the same at regular intervals.

The supporting frame of the machine is composed of two sections 8 and 9 which are pivotally connected by the before mentioned king-bolt and it is supported at its ends upon traction wheels 10 and 12.

The forward frame section carries two rakes 13 which are mounted for rotation about rearwardly converging axes to conjointly gather the hay into a windrow in the center of the machine.

Each rake is preferably composed of three or more toothed members which during rotation are held in their operative position by a gearing shown at 14 in Figure 1.

Rakes of this character are well known in the art and inasmuch as the specific construction of their operating mechanism is not part of the present invention, the mechanism has not been shown in detail and will not further be described.

The rakes 13 receive their rotary movement from the axle 15 of the front wheels of the machine by means of two pairs of beveled gear wheels 16 and 17 and the rakes are connected to their respective shafts by clutches 18 which are adjustable from the driver's seat 19 of the machine through the medium of a fulcrumed pedal 20 and a system of levers 21.

Each clutch is by means of a key $18^a$ shown in Figure 4, slidably mounted on the shaft upon which the respective rake 13 is loosely supported and it normally engages with its correlative on the rake whereby the latter is compelled to rotate with the shaft. The clutches are attached to the forked extremities of levers $21^a$ and these levers are pivotally connected to the ends of a bifurcated lever $21^c$ which is pivotally connected at the lower end of the pedal 20.

When the pedal is moved about its fulcrum by foot-pressure, the rearward movement of its lower arm causes the moving members of the two clutches to simultaneously disengage the rakes with the result that the rotative continuity of the latter with the respective shafts is broken.

The cocking element of the machine comprises two rakes 22 and 23 extending transversely of the frame and cooperating to gather the hay in the windrow produced by the first described raking element into hay cocks of uniform size and form.

The forward rake on the cocking element has a series of curved teeth of uniform size set on a head 24 and the other rake, at the rear end of the machine, has curved teeth which decrease in length from the center of its head 25 in opposite directions to gather the hay into a cock by the arcuate arrangement of their points.

The traction wheels 12 at the rear end of the machine are mounted to revolve upon spindles 26 which are rigidly secured upon laterally projecting arms 27 at the rear end of the frame and toothed wheels 28 connected at the inside of the wheels 12 serve in the operation of the machine to intermittently lift the rakes of the cocking element as will hereinafter be more fully described.

The head 25 of the rearmost rake is pivotally connected with the spindles by a plurality of U-straps 29 and it carries a pair of pawls 30 which normally engage the toothed wheels on the traction wheels.

The two pawls are formed integrally at the ends of a rod 31 which is movably connected with the rake head in parallel relation thereto through the medium of a pair of loops 32 through which it loosely extends.

A forwardly projecting tappet 33 on the rod is placed to engage a relatively fixed stop 34 on the frame of the machine to separate the pawls from the respective cog-wheels at a determinate point in the upward movement of the rake with which the rod is connected, and an upwardly extending arm 35 on the rod is provided to impellently engage an operating lever 36 which controls the position of the forward rake of the shocking element.

The head of the last-mentioned rake is fastened between two parallel crank arms 37 on a shaft 38 which is rotatably supported in bearings 39 on the frame and which is pivotally connected with the above referred to operating lever 36 through the medium of an arm 40 extending at an angle to the others.

The lever is fulcrumed in coaxial relation to a toothed segment 41 which cooperates with a movable spring-pressed pawl 42 on the lever to lock the parts in their adjusted positions.

A plurality of rods 43 extending slantingly from the frame into the dish of the curved rake 22 prevents excessive upward movement of the hay and cooperate with the rake teeth to gather it into compact cocks.

In the operation of my invention the machine is drawn over the hay left on the field by the machine used in cutting it, by draft animals or a tractor engine. The converging rakes at the front of the machine gather the hay into a windrow, the curved rake at the rear of the same bunches the hay in the windrow into cocks which are deposited on the field at regular intervals, and the intermediate rake clears the ground forward of the cocking rake so that the hay cocks are dumped on a clean and well raked stubble.

The toothed wheels 28 rotating with the rear traction wheels carry the pawls 30 which by gravity are held in engagement with the teeth thereof, downwardly and by the engagement of the rod on which the pawls are formed, with the loops 32, cause the head 25 of the cocking rake to turn about the shaft 26, thereby elevating the rake for the purpose of dumping the hay which it gathered into a cock.

The engagement of the upwardly projecting arm 35 on the rod of the pawls with the operating lever 36 at the same time raises the rake head 24 which is locked in its adjusted position by the detent on the lever entering the notches of the segment. At a predetermined point in the rotating movement of the rakes, the cocking rake is released by the engagement of the tappet 33 with the stop 34 on the frame and drops to its original position in which the points of its teeth are in contact with the ground.

The rake remains in this position until the rod of the pawls again engages the front sides of the loops 32 in which it has its movement, when the above described operation is repeated.

Before the cocking rake is again elevated the driver of the machine occupying the seat 19 returns the auxiliary rake to its operative position, thereby clearing the ground on which the hay cock formed by the other rake is subsequently dumped.

Having thus described my invention what I claim and desire to secure by Letters-Patent is:

1. A combined hay rake and cocker comprising in combination with a wheeled frame, a rake element adapted to gather the swath on a field into a windrow central of the machine, a rake adapted to gather the hay in said windrow into cocks, mechanism to intermittently raise said rake by the movement of the machine, a clearing-rake forward of the cocking rake, and mechanism for raising the clearing rake by the movement of the machine.

2. In a hay rake and cocker, the combination with a wheeled frame, of a rake adapted to gather the hay in a windrow into cocks, a clearing rake forward thereof, mechanism for intermittently raising the cocking rake by the movement of the machine, and means for raising the clearing rake by the movement of the first-named rake.

3. In a hay rake and cocker, the combination with a wheeled frame, of a rake adapted to gather the hay in a windrow into cocks, a clearing-rake forward thereof, a lever to raise and lower said clearing-rake, and mechanism for moving said lever by the movement of the machine to a position in which the clearing rake is raised.

4. In a hay rake and cocker, the combination with a wheeled frame, of a rake adapted to gather the hay in a windrow into cocks, mechanism to intermittently raise said rake by the movement of the machine, a clearing rake forward of the first-named rake, a lever to raise and lower the clearing rake, and means included in said mechanism to move the lever to a position in which the clearing rake is raised.

5. A combined hay rake and cocker comprising in combination, a carriage, a gathering rake, a cocking rake, mechanism actuated by the movement of the carriage to automatically lift the cocking rake at regular intervals, and a rake between the other rakes, adapted to clear the field forward of the cocking rake.

6. In a combined hay rake and cocker, the combination of a frame composed of pivotally connected wheeled sections, a gathering rake on one of said sections, and a cocking rake on the other section.

7. A combined hay rake and cocker comprising in combination, a carriage, a gathering rake, a cocking rake, mechanism actuated by the movement of the carriage to intermittently raise said cocking rake, a clearing rake in the path of the cocking rake, and mechanism actuated by movement of the cocking rake to raise the clearing rake.

8. In a hay rake and cocker, the combination of a carriage, a cocking rake, and mechanism actuated by the movement of the carriage to alternately raise and release said rake, comprising a toothed wheel connected for rotation with a wheel of the carriage, a movable element having a loose connection with the rake and including a pawl normally engaging said toothed wheel and a tappet to disengage the pawl from the wheel, and a releasing stop disposed to cause the pawl to disengage the wheel by engagement with the tappet at a determined point of the movement of the element with the wheel.

9. In a hay rake and cocker, the combination of a carriage, a cocking rake, mechanism actuated by the movement of the carriage to alternately raise and release said rake, comprising a toothed wheel connected for rotation with a wheel of the carriage, a movable element having a loose connection with the rake and including a pawl normally engaging said toothed wheel and a tappet to disengage the pawl from the wheel, and a releasing stop disposed to cause the pawl to disengage the wheel by engagement with the tappet at a determinate point of the movement of the element with the wheel, a clearing rake forward of the other rake, and means actuated by the movement of the pawl to raise and lower the clearing rake.

10. A combined hay rake and cocker comprising in combination, a carriage, a transverse tiltable cocking rake thereon, two converging rotary rakes adapted to gather hay left on the field in the path of the cocking rake, and mechanism actuated by movement of the carriage to rotate the gathering rakes in opposite directions and to periodically raise and lower the cocking rake.

In testimony whereof I have affixed my signature.

WARREN W. HENCH.